United States Patent
Kizawa et al.

(10) Patent No.: US 7,952,471 B2
(45) Date of Patent: May 31, 2011

(54) GENERATOR CONTROL APPARATUS HAVING ALARM ISSUING UNIT

(75) Inventors: Toshikazu Kizawa, Kariya (JP); Tomomi Tsuzuki, Toyota (JP)

(73) Assignee: Denso Corporation, Kariya (JP)

( * ) Notice: Subject to any disclaimer, the term of this patent is extended or adjusted under 35 U.S.C. 154(b) by 672 days.

(21) Appl. No.: 11/979,522

(22) Filed: Nov. 5, 2007

(65) Prior Publication Data

US 2008/0106395 A1  May 8, 2008

(30) Foreign Application Priority Data

Nov. 6, 2006  (JP) .................................. 2006-299934

(51) Int. Cl.
*B60Q 1/00* (2006.01)

(52) U.S. Cl. ......................................... 340/438; 340/455

(58) Field of Classification Search .................. 340/438, 340/439, 455; 322/23, 24, 22
See application file for complete search history.

(56) References Cited

U.S. PATENT DOCUMENTS

| | | | | |
|---|---|---|---|---|
| 2,314,501 A | * | 3/1943 | Jervis | 290/40 R |
| 4,316,134 A | * | 2/1982 | Balan et al. | 322/99 |
| 4,559,486 A | * | 12/1985 | Spencer et al. | 322/99 |
| 4,820,966 A | * | 4/1989 | Fridman | 320/116 |
| 5,625,337 A | * | 4/1997 | Medawar | 340/449 |
| 5,682,134 A | * | 10/1997 | Stallbohm | 340/426.27 |
| 6,091,325 A | * | 7/2000 | Zur et al. | 340/455 |
| 6,184,661 B1 | * | 2/2001 | Becker et al. | 322/25 |
| 6,222,445 B1 | * | 4/2001 | Beckhusen | 340/457 |
| 6,316,919 B1 | * | 11/2001 | Sumimoto et al. | 322/28 |
| 6,635,974 B1 | * | 10/2003 | Karuppana et al. | 307/140 |
| 6,791,464 B2 | * | 9/2004 | Huang | 340/636.15 |
| 6,924,621 B2 | * | 8/2005 | Jabaji et al. | 320/123 |
| 7,180,272 B2 | * | 2/2007 | Okahara et al. | 322/37 |
| 7,235,953 B2 | * | 6/2007 | Aoyama | 322/28 |
| 7,508,172 B1 | * | 3/2009 | Nishimura et al. | 322/37 |
| 2003/0224833 A1 | * | 12/2003 | Egan et al. | 455/572 |
| 2006/0066442 A1 | * | 3/2006 | Hamada | 340/10.1 |
| 2006/0108987 A1 | * | 5/2006 | Aoyama | 322/28 |
| 2007/0001680 A1 | * | 1/2007 | Khoo | 324/430 |

FOREIGN PATENT DOCUMENTS

JP  A-2006-025558  1/2006

* cited by examiner

*Primary Examiner* — Daniel Wu
*Assistant Examiner* — Rufus Point
(74) *Attorney, Agent, or Firm* — Oliff & Berridge, PLC

(57) ABSTRACT

There is provided a generator control apparatus that includes a generating condition detector, an alarm issuing unit, and an alarm controller. The generating condition detector detects an operating condition of the generator for use in a vehicle. The alarm issuing unit is configured to issue alarm to a driver of the vehicle about an abnormal operating condition of the generator when the generating condition detector detects the evidence that the generator is running under an abnormal condition, and to stop to issue alarm to the driver when the generating condition detector detects the evidence that the generator is running in a normal condition.

7 Claims, 6 Drawing Sheets

GENERATOR CONTROL APPARATUS HAVING ALARM ISSUING UNIT

CROSS REFERENCE TO RELATED APPLICATION

The present application relates to and incorporated by reference Japanese Patent Application No. 2006-299934 filed on Nov. 6, 2006.

BACKGROUND OF THE INVENTION

1. The Field of the Invention

The present invention relates to an apparatus and method for controlling operating conditions of an on-vehicle generator.

2. Description of the Prior Art

A generator control apparatus has been known which is for use in an automotive vehicle having an engine and which detects operating conditions of an on-vehicle generator (hereinafter simply referred to as a "generator") and issue an alarm to inform a driver of the automotive vehicle about occurrence of a trouble in the generator. Further, it is known that there are a generator control apparatuses for use in an automotive vehicle having an engine and a battery, which detects operating conditions of not only a generator but also an on-vehicle battery (hereinafter simply referred to as a "battery"), and issue an alarm to inform a driver of the automotive vehicle about occurrence of a trouble in either the generator or the battery, if at least one of an output voltage of the generator and that of the battery does not reach their corresponding predetermined values.

As one of the latter known generator control apparatuses, there is a known generator control apparatus includes an operating condition detecting unit and an alarm issuing unit. The operating condition detecting unit detects an evidence that the generator starts to generate electric power and output voltages of the generator and the battery. The alarm issuing unit that issues an alarm by, for example, winking a charging lamp if at least one of the output voltages of the generator and the battery is lower than a predetermined value.

A key switch of an automotive vehicle outputs an ignition signal to a starter of an engine of the automotive vehicle to energize the starter. A generator and a battery are usually provided in the vehicle in order to supply electric power to electric loads installed in the automotive vehicle. Further, the generator and the battery assist the engine to start to rotate by activating the starter of the engine. In order to start up the automotive vehicle, a driver of the automotive vehicle turns on the key switch to output the ignition signal to the starter. Because the generator is driven by the engine, the generator starts to generate electric power immediately after the activation of engine. When the driver turns off the key switch, the starter of the engine stops its operation. Since the starter consumes a large amount of electric power, if the starter continues to run even after the generator has been activated, it may be occurred that an output voltage of the battery or the generator cannot reach a sufficient level to supply an enough electric power to the electric loads. If the generator control apparatus is configured to issue the alarm to inform the driver of the automotive vehicle about occurrence of a trouble in the generator when the generator does not generate an enough output voltage, the alarm is issued to the driver by, for example, winking of a charging lamp. However, this situation is obtained in some troubles in the generator and the battery.

In the generator control apparatus disclosed in Japanese Patent Laid-Open Publication No. 2006-25558, even if the output voltage of the generator or that of the battery is lower than a predetermined value after a generator becomes to be in a running state, it is prevented from issuing an alarm to inform the driver of the automotive vehicle about occurrence of a trouble in either the generator or the battery until a predetermined time has elapsed from a starting time when the generator of the vehicle becomes to be in the running state. Surely, a voltage drop of the generator is one of the abnormal operating conditions. However, as discussed above, even if the output voltage of the generator is lower than the predetermined value, especially when the engine is activating, the generator may have none of troubles. Therefore, if it is prevented from issuing an alarm to inform the driver of the automotive vehicle about occurrence of a trouble in either the generator or the battery until a predetermined time has elapsed from a starting time when the generator of the vehicle starts to generate electric power, the driver of the vehicle is freed from having to worry about the trouble of the generator or the battery of the vehicle.

In more detail, the generator control apparatus disclosed in Japanese Patent Laid-Open Publication No. 2006-25558 has an operating condition detecting unit, a comparing unit, an alarm issuing unit, and an alarm stopping unit. The operating condition detecting unit detects the output voltage of the generator and that of the battery as an operating condition of the generator. Hence the operating condition detecting unit can determine whether or not the generator becomes to be in a running state. In more detail, the operation detecting unit determines whether or not the generator becomes to be in the running state based on a phase voltage of an armature winding of the generator. If the phase voltage of the armature winding becomes larger than a predetermined value, the operation detecting unit concludes that the generator becomes to be in the running state. The comparing unit compares the output voltages of the generator and the battery to a predetermined value. If the comparing unit concludes that the output voltage of the generator or the battery is small compared with the predetermined value, the alarm issuing unit issues an alarm to inform the driver of the automotive vehicle about occurrence of a generator trouble or battery trouble over a predetermined period after the comparing unit has concluded the generator becomes to be in the running state. The alarm stopping unit stops alarm issuing such as winking of the charging lamp until a predetermined time has elapsed from a start time of generating electric power by the generator. That is, the generator control apparatus described above can prevent from misjudging whether or not the generator or the battery has some trouble in particular after the generator becomes to be in the running state. Therefore, by using the generator control apparatus disclosed in Japanese Patent Laid-Open Publication No. 2006-25558, the driver of the vehicle is surely freed from having to worry about the trouble of the generator or the battery of the automotive vehicle when the output voltages of the generator and the battery greatly fluctuate because the generator and the battery of the automotive vehicle do not reach their steady state.

However, the generator control apparatus issues an alarm if the operating condition detecting unit intermittently detects the output voltage of the generator is low compared to the predetermined value and concludes that the generator intermittently stops to generate electric power just after the engine is activated, that is, the generator starts to generate electric power at which a large fluctuation of a rotation speed of the engine can appear. In a period between a time when the generator starts to generate electric power and a further time when the generator becomes to be in a running state, the rotation speed of the engine can fluctuate greatly. That is, if the phase voltage of the armature winding drops instantaneously due to the large fluctuation of the rotation speed of the engine, the generator control apparatus issues an alarm to inform a driver of the automotive vehicle about generator trouble.

SUMMARY OF THE INVENTION

In view of the above problems, an object of the present invention is to provide an improved generator control apparatus that prevents from issuing an alarm such as winking of the charging lamp, even if a generator control apparatus intermittently detects the evidence of an abnormal operating condition of a generator due to a large fluctuation of a rotation speed of the engine just after the engine is activated.

According to one aspect of the present invention, there is provided a generator control apparatus for use in an automotive vehicle having a generator and an engine, which includes a generating condition detector, an alarm issuing unit, and an alarm controller. The generating condition detector detects an operating condition of the generator. The generating condition detector can determine that the generator starts to run, that is, the engine of the automotive vehicle is activated. The alarm issuing unit is configured to issue an alarm to a driver of the vehicle about an abnormal operating condition of the generator when the generating condition detector detects any evidence that the generator is running under an abnormal condition, and to prevent any alarm from being issued to the driver when the generating condition detector detects the evidence that the generator is running in a normal condition. The abnormal operating condition of the generator is sometimes found just after the engine is activated. The alarm controller is configured to invalidate an operation of the alarm issuing unit until a predetermined time has elapsed from a start time of generating electric power by the generator in response to an ignition signal from a key switch of the vehicle. The start time when the generator starts to generate electric power is detected by the generating condition detector. The generator control apparatus with a structure described above has an advantage in that the driver of the vehicle is freed from having to worry about the condition of the generator of the vehicle even if the generator control apparatus detects the evidence of an abnormal operating condition of a generator due to a large fluctuation of a rotation speed of the engine during activation of the engine of the vehicle because the generator control apparatus according to the present invention does not compare an output voltage of the generator to any reference value.

According to another aspect of the present invention, there is provided a generator control method for controlling a generator. The generator control method according to the present invention includes steps of: detecting an operating condition of the generator in order to determine whether the operating condition of the generator is normal or abnormal, issuing an alarm to inform a driver of the vehicle about an abnormal operating condition of the generator, and controlling the alarm so as to prevent the alarm from being issued until a predetermined time has elapsed from a start time of generating electric power by the generator in response to an ignition signal from a key switch of the vehicle. The generator control method has an advantage in that the driver of the vehicle is freed from having to worry about the condition of the generator of the vehicle even if the generator control apparatus detects the evidence of an abnormal operating condition of a generator due to a large fluctuation of a rotation speed of the engine during activating the engine of the vehicle.

DETAILED DESCRIPTION OF PREFERRED EMBODIMENTS

Referring to the accompanied drawings, a generator control apparatus, which is in accordance with the present invention, will now be discussed.

First Embodiment

Figure 1:
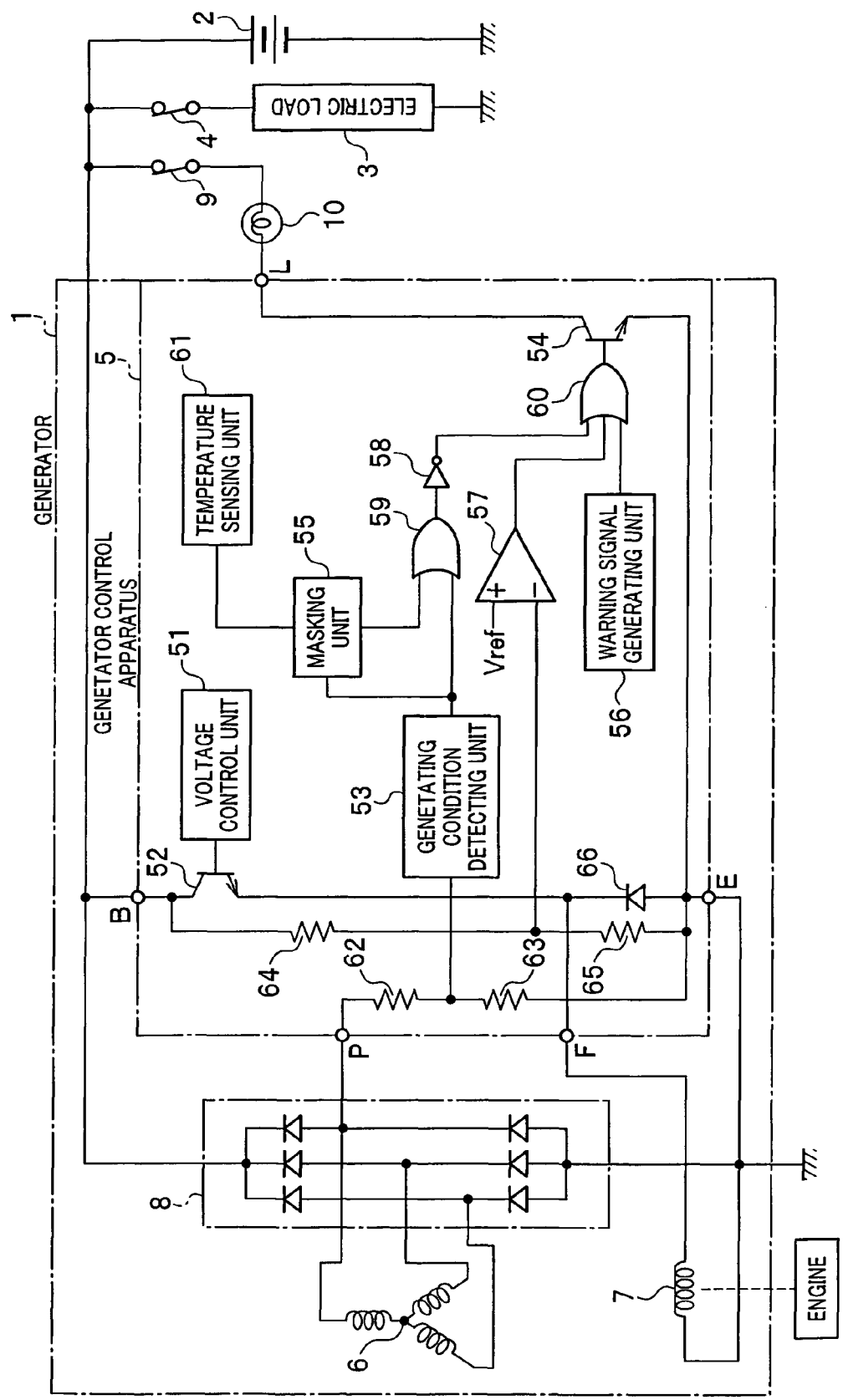
FIG. 1 is a block diagram showing an on-vehicle generator, the on-vehicle generator including a generator control apparatus according to a first embodiment of the present invention.

FIG. 1 is a block diagram showing an on-vehicle generator (hereinafter it will be referred to as a "generator") 1, a battery 2, an electric load 3, a key switch 9, a load switch 4, and a charging lamp 10. The generator 1 includes a generator control apparatus according to a first embodiment of the present invention.

As shown in FIG. 1, the generator 1 includes a generator control apparatus 5, an armature winding 6, a field coil 7, and a rectifier unit 8. The generator 1, which is mainly used in the automotive vehicle, is driven by an engine, which may be an internal combustion engine, via a belt and a belt pulley.

The field coil 7 generates a magnetic field if electric power is supplied thereto. The field coil 7 is wound around a magnetic core (not shown in FIG. 1) to form a rotor. The armature winding 6 is constituted of a plurality of phase windings, e.g., three phase windings shown in FIG. 1, and wound around an armature core to form an armature. The armature winding 6 generates electric power when the rotor rotates and the field coil 7 provides the magnetic field acting on the armature winding 6. The output electric power of the armature winding 6 is rectified by the rectifier unit 8. The output electric power of the armature winding 6 is alternating electric current. The output electric power of the rectifier unit 8 is supplied to the battery 2, the electric load 3. The rectifier unit 8 is connected to the electric load via the load switch 4 and to one of terminals of the charging lamp via the key switch 9.

The output electric power of the generator 1 is changed as a rotation speed of the engine or an excitation current flowing through the field coil 7 is changed. The excitation current supplied to the field coil 7 is controlled by the generator control apparatus 5.

The generator control apparatus 5 is connected to another terminal of the charging lamp 10 that is opposite from one connected to the rectifier unit 8, via an alarm terminal of the generator control apparatus 5 (the terminal L in FIG. 1). The terminal of the charging lamp that is connected to the rectifier unit 8 is also connected a cathode terminal of the battery 2 via the key switch 9.

Next, a detailed description about the generator control apparatus 5 will be given. The generator control apparatus 5 includes a voltage control unit 51, a generating condition detector 53, a masking unit 55, an warning signal generating unit 56, a temperature sensing unit 61, switching elements 52, 54, a comparator 57, an inverter unit 58, OR units 59, 60, resisters 62, 63, 64, 65, and a flywheel diode 60.

The voltage control unit 51 compares the output voltage of the generator 1 with a set value of control voltage in order to turn on and turn off the switching element 52. For example, if the output voltage of the generator 1 is lower than the set value of control voltage, the switching element 52 is turned on under a pulse width modulation (PWM) control with a predetermined duty ratio. In contrast to this, if the output voltage of the generator 1 is higher than the set value of control voltage, the switching element 52 is turned off. The switching element 52 has three terminals, that is, a base terminal, an emitter terminal and a collector terminal. The base terminal of the switching element 52 is connected to the voltage control unit 51. The collector terminal is connected to an output terminal of the generator 1 (the terminal B in FIG. 1). The emitter terminal of the switching element 52 is connected to a ground terminal (the terminal E in FIG. 1) via the flywheel diode 60. The emitter terminal of the switching element 25, 52 is also connected to the field coil 7 via the terminal F in FIG. 1. If the switching element 52 is turned on, the excitation current is supplied to the field coil 7. If the switching element 52 is turned off, supplying the excitation current to the field coil 7 is stopped. The flywheel diode 60 is connected in parallel with the field coil 7 so as to pass the excitation current through the flywheel diode 60 when the switching element 52 is turned off.

The generating condition detector 53 detects the operating condition of the generator 1 based on phase voltage of the armature winding 6 which appears at the terminal P in FIG. 1. In more detail, the phase voltage of the armature winding 6 is divided by a dividing unit constituted by the resister 62, 63 and inputted into the generating condition detector 53. The generating condition detector 53 produces a high level output indicating that the generator 1 is generating electric power if amplitude of this input voltage from the dividing unit is larger than a reference voltage. If the amplitude of this input voltage from the dividing unit is smaller than or equal to the reference voltage, the generating condition detector 53 produces a low level output indicating that the generator 1 is not generating electric power.

The masking unit 55 continues to produce a high level output during a predetermined interval after the generating condition detector 53 detects the evidence that the generator 1 generates electric power. Hence, the masking unit 55 continues to produce the high level output for the predetermined interval after the generating condition detector 53 detects the evidence that the generator 1 generates electric power. The interval over which the masking unit 55 produces the high level output is referred to as a masking time. The masking time depends on the environmental temperature of the generator control apparatus 5. The environmental temperature of the generator control apparatus 5 is detected by the temperature sensing unit 61. For example, the masking time is set to be long, in a condition where the environmental temperature of the generator control apparatus 6 is low, that is, the temperature detected by the temperature sensing unit 61 is lower than a predetermined value. This relationship between the masking time and the environmental temperature is based on a fact that a rotation speed of the engine has a large fluctuation just after the engine is activated. In contrast, the masking time is set to be short in a condition where the environmental temperature of the generator control apparatus 6 is high, that is, temperature detected by the temperature sensing unit 61 is higher than or equal to a predetermined value, because the rotation speed of the engine does not have a large fluctuation just after the engine is activated. It is allowed that the masking time is continuously changed as the environmental temperature of the generator control apparatus 6 detected by the temperature sensing unit 61 is changed. Further, the rotation speed of the engine is influenced not only by the environmental temperature of the generator control apparatus 6, but also by engine temperature including water temperature in an engine cooling system. Hence, instead of detecting the environmental temperature of the generator control apparatus 6 detected by the temperature sensing unit 61, it is possible to detect another temperature than the environmental temperature of the generator control apparatus 6, which has a correlation with the engine temperature, by further comprising a sensor that measure such temperature, and to use such temperature as a parameter to adjust the masking time.

Figure 2:
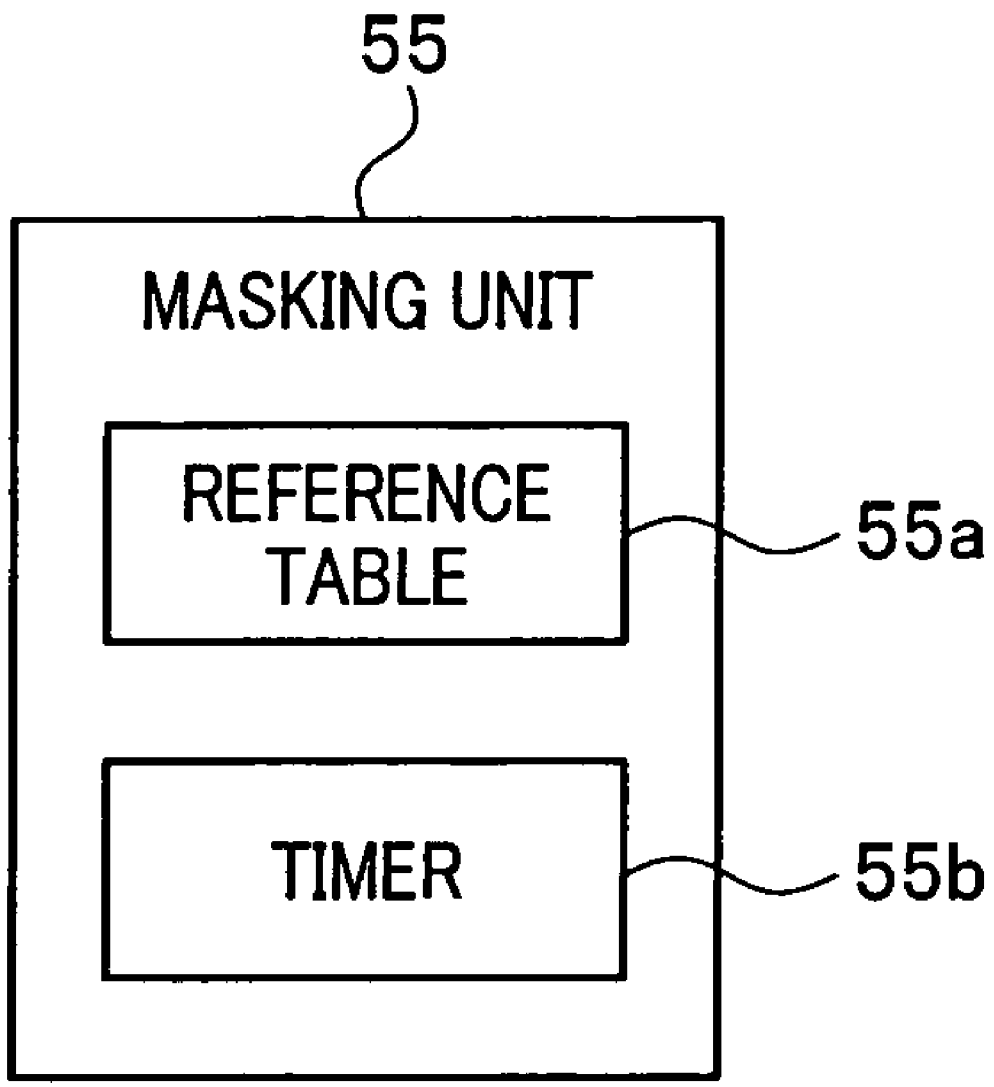
FIG. 2 is a block diagram showing an masking unit shown in FIG. 1.

FIG. 2 is a block diagram of the masking unit 55 shown in FIG. 1. The masking unit 55 includes a timer 55a and a reference table 55b. The timer counts time. The reference table 55b contains information about the relationship between the masking time and the environmental temperature.

The timer 55a is included in the masking unit 55 in this embodiment. However, it is possible to be mounted outside the masking unit 55 but in the generator 1. Further, it is allowable that the timer 55a is provided as an external device of the generator 1.

The OR unit 59 has two input terminals and an output terminal. One of the input terminals of the OR unit 59 is connected to the generating condition detector 53. Another of the input terminals of the OR unit 59 is connected to the masking unit 55. If the OR unit 59 receives at least one of the high level outputs of the generating condition detector 53 and the masking unit 55, it produces a high level output. That is, if both the generating condition detector 53 and the masking unit 55 produce the low level output, the OR unit 59 produces the low level output. The output terminal of the OR unit 59 is connected to the inverter unit 58. If the OR unit 59 produces a low level output, the inverter unit 58 produces a high level output. The high level output of the inverter unit 59 is used as a generator stopping alarm signal.

The comparator 57 has a positive input terminal and a negative input terminal. The positive input terminal of the comparator 57 receives a reference voltage Vref. The negative input terminal of the comparator 57 receives divided voltage which is a portion of the output voltage of the generator 1 divided by a dividing unit constituted by the resister 64, 65. If the divided voltage divided by the resister 64, 65 is lower than the reference voltage Vref, the comparator 57 produces a high level output as a low voltage alarm signal. In contrast to this, if the divided voltage divided by the resister 64, 65 is higher than or equal to the reference voltage Vref, the comparator 57 produces a low level output.

The warning signal generating unit 56 detects any other abnormal operating condition of the generator 1 and the battery 2 from those cause wither the generator stopping alarm signal or the low voltage alarm signal. Any other conditions include a failure of a charging unit for the battery 2, an overvoltage of the generator 1, a broken lead in an exciting unit and the like. If the warning signal generating unit 56 detects those abnormal operating condition, it produces a high level output as a warning signal.

The OR unit 60 produces a high level output to turn on the switching element 54 if at least one of the output signals from the inverter unit 58, the comparator 57 and the warning signal generating unit 56 is the high level. In contrast, all of the outputs from the inverter unit 58, the comparator 57 and the warning signal generating unit 56 are the low level outputs, the OR unit 60 produces a low level output to turn off the switching element 54. The switching element 54 has an emitter terminal, a collector terminal, and a base terminal. The emitter terminal of the switching element 54 is connected to a grounding terminal. The collector terminal of the switching element 54 is connected to one of terminals of the charging lamp 10 via the terminal L in FIG. 1. If the switching element 54 is turned on, the charging lamp 10 lights up. In contrast, the switching element 54 is turned off, the charging lamp 10 lights out. Hence, if at least one of the output signals from the inverter unit 58, the comparator 57 and the warning signal generating unit 56 is the high level, the charging lamp lights up.

As described above, in the generator control apparatus 5 according to this embodiment of the present invention, the masking unit 55 continues to produce the high level output for a predetermined interval after the generating condition detector 53 detects the evidence that the generator 1 starts to generate electric power. Thus, the generator stopping alarm signal produced by the inverter unit 59 is masked, even if frequency of phase voltage of an armature winding 6 of the generator 1 falls below a predetermined value intermittently, or the phase voltage of the armature winding 6 of the generator 1 falls below a predetermined value intermittently in a situation where the rotation speed of the engine fluctuates largely just after the engine of the vehicle is activated. As a result of this, the switching element 54 keeps to produce the high level output so as to prevent from lighting up the charging lamp 10. Therefore, it is possible to prevent from informing the driver of the abnormal operating condition of a generator 1 due to the large fluctuation of a rotation speed of the engine during activating the engine of the vehicle by lighting up the charging lamp 10 intermittently.

Further, the driver of the vehicle concentrates his or her attention to an abnormal operating condition of the generator 1 due to other reason than the large fluctuation of the rotation speed of the engine just after the engine of the vehicle is activated, such as small output voltage of the generator 1 or the battery 2 and over-voltage of the generator 1 or the battery 2, and the like.

Further, the masking time depends on environmental temperature of the generator control apparatus 5. The environmental temperature of the generator control apparatus 5 is detected by the temperature sensing unit 61. For example, the masking time is set to be long in the condition where the environmental temperature of the generator control apparatus 6 is low, that is, temperature detected by the temperature sensing unit 61 is lower than the predetermined value, because a rotation speed of the engine has the large fluctuation just after the engine is activated. In contrast, the masking time is set to be short in the condition where the environmental temperature of the generator control apparatus 6 is high, that is, temperature detected by the temperature sensing unit 61 is higher than or equal to a predetermined value, because the rotation speed of the engine does not have the large fluctuation just after the engine is activated. As a result of having a temperature dependence of the masking time over which the masking unit 55 prevents from issuing alarm, the masking unit 55 prevents from issuing alarm informing the driver about the abnormal operating condition of a generator 1 due to the large fluctuation of the rotation speed of the engine. Further the masking unit 55 set a suitable masking time by considering the environmental temperature.

In the above mentioned constituents, the generating condition detector 53 serves as generating condition detecting means and generator condition detector. The OR unit 60 and the switching element 54 are constituted of alarm issuing means and an alarm issuing unit. The masking unit 55 and the OR unit 60 are constituted of alarm control means and an alarm controller.

The operation of the apparatus according to the present invention will now be explained with referring to FIG. 3.

Figure 3:
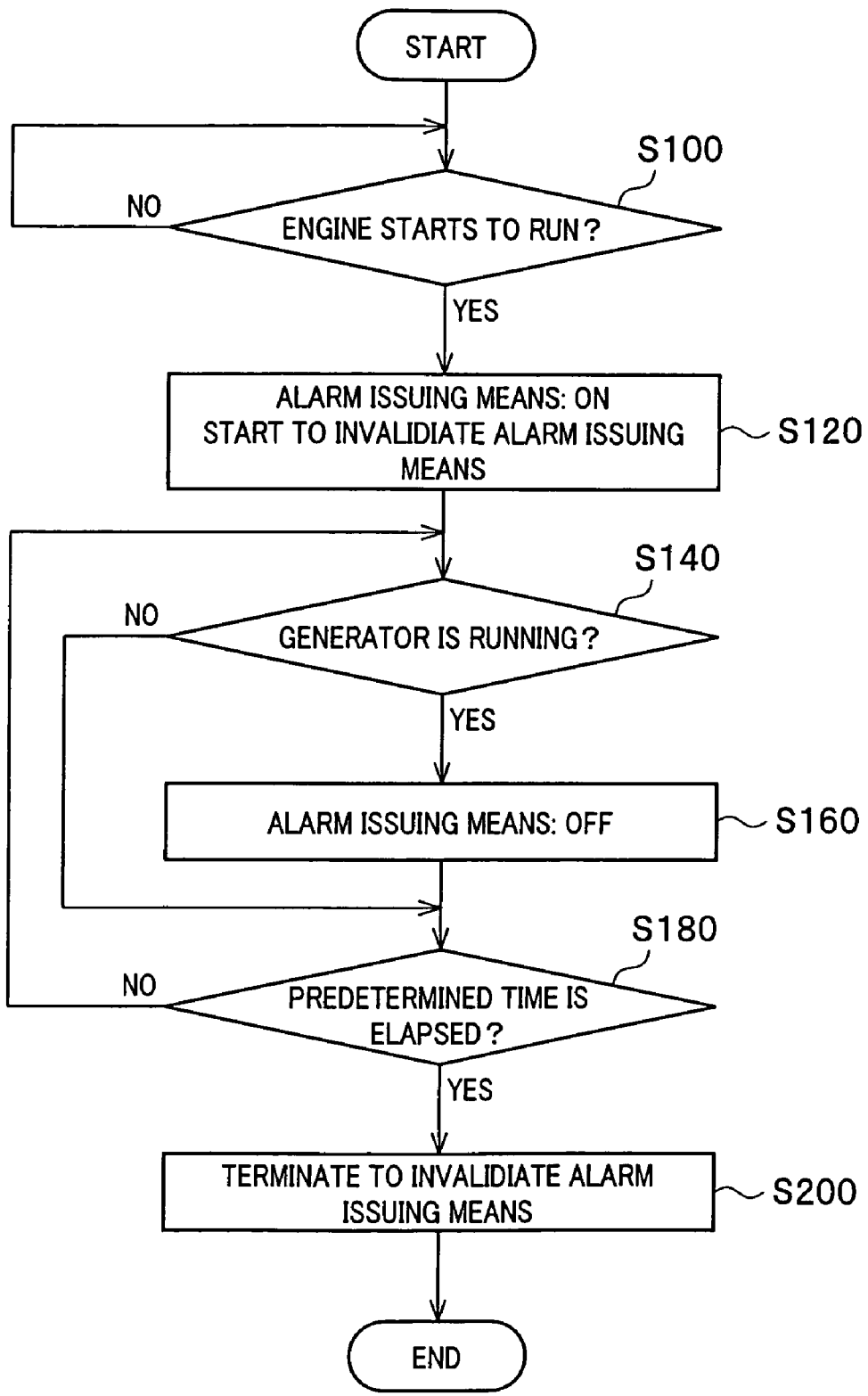
FIG. 3 is a flow chart showing an operation of the generator control apparatus shown in FIG. 1.

FIG. 3 is a flow chart showing an operation of the apparatus with a structure described above.

In step S100, it is judged whether or not the engine starts to run. This step is executed by the generating condition detecting means. If the result of this judgment is "NO", this step is repeatedly executed. If the result of the judgment in step S100 is "YES", the timer 55a starts to count time and the procedure proceeds to step S120.

In step S120, both the alarm issuing means and the alarm control means simultaneously starts their operations. That is, the alarm issuing means starts to issue an alarm to inform the driver about that the generator 1 does not fall in its running state, and the alarm control means invalidates the operation of the alarm issuing means. As the result of this, the alarm is not issued.

In step S140, it is judged whether or not the generator falls in its running state. This judgment is executed by the generating condition detecting means. In more detail, if the phase voltage of the armature winding 6 is large compared with the reference value, the generating condition detecting means concludes that the generator 1 starts to generate electric power. If the result of this judgment is "NO", the procedure proceeds to step S180. If the result of the judgment in step S100 is "YES", the procedure proceeds to step S160.

In step S160, the alarm issuing means stops to issue the alarm. However, even if the alarm issuing means steps its current operation, the alarm control means invalidates the operation of the alarm issuing means. Hence, even if the phase voltage of the armature winding drops instantaneously due to the large fluctuation of the rotation speed of the engine, the alarm is not issued. Then the procedure proceeds to step S180.

In step S180, it is judged whether or not a predetermined time is elapsed since the generator starts to generate electric power. This step is executed by the alarm control means. If the result of this judgment is "NO", the procedure proceeds to step S140. If the result of the judgment in step S180 is "YES", the procedure proceeds to step S200.

In step S200, the alarm control means steps to invalidate the operation of the alarm issuing means.

Figure 4:
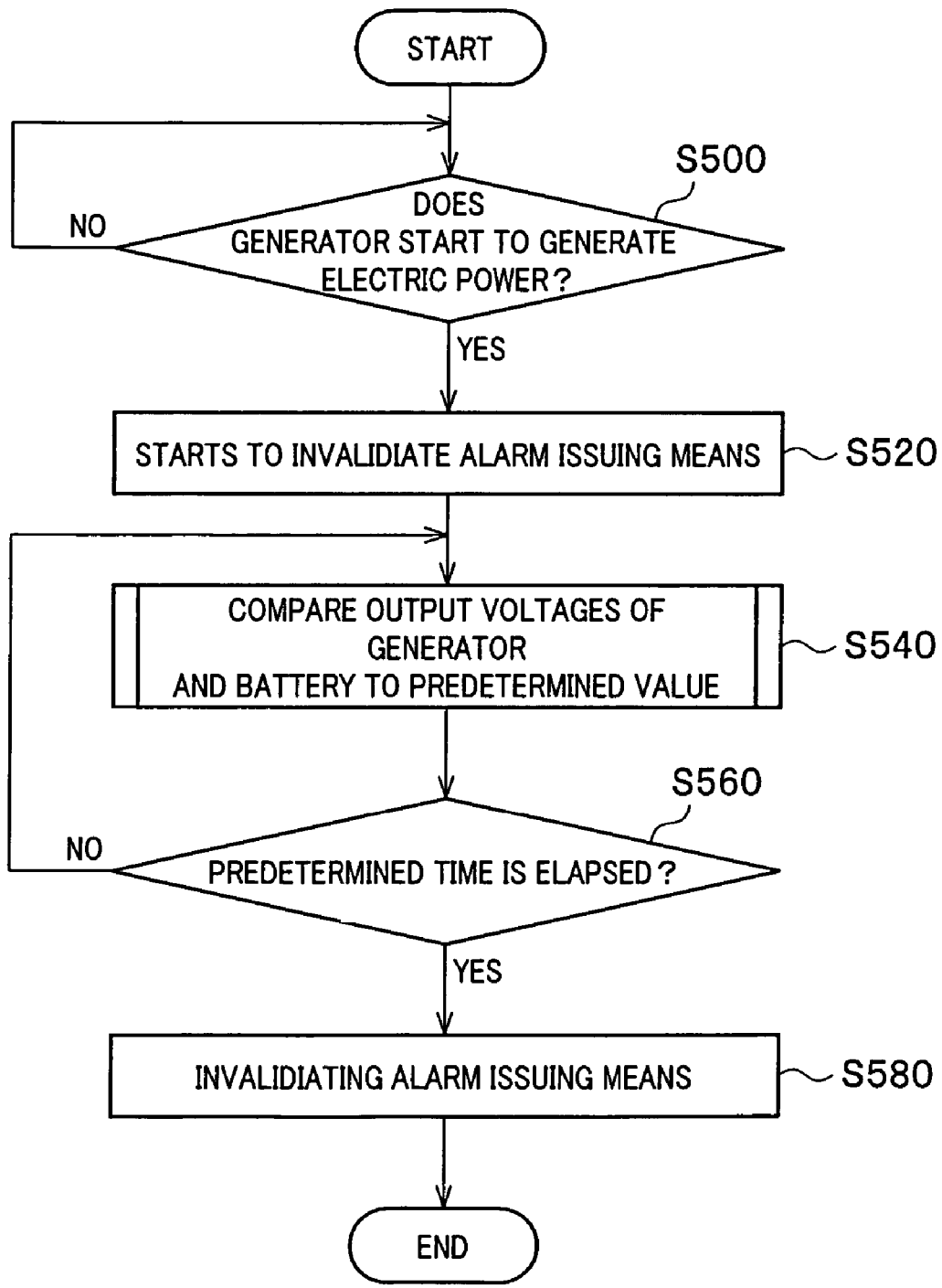
FIG. 4 is a flow chart showing an operation of a known prior art of generator control apparatuses.

FIG. 4 is a flow chart showing an operation of the generator control apparatus disclosed in Japanese Patent Laid-Open Publication No. 2006-25558.

As already described, this known generator control apparatus has an operating condition detecting unit, a comparing unit, an alarm issuing unit, and an alarm stopping unit. The operating condition detecting unit detects the output voltage of the generator and that of the battery. If the phase voltage of the armature winding of the generator becomes larger than a predetermined value, the operation detecting unit concludes that the generator is running. The comparing unit compares the output voltages of the generator and the battery to a predetermined value. If the comparing unit concludes that the output voltage of the generator or the battery is small compared with the predetermined value, the alarm issuing unit issues an alarm to inform the driver of the automotive vehicle about occurrence of a generator trouble or battery trouble over a predetermined period after the comparing unit has concluded so. The alarm stopping unit stops alarm issuing such as winking of the charging lamp until a predetermined time has elapsed from a time when the generator falls in a running state.

In step S500, it is judged whether or not a generator starts to generate electric power. This judgment is executed by the operating condition detecting unit. If a phase voltage of an armature winding is large compared with the reference value, the operating condition detecting unit concludes that the generator starts to generate electric power. In the apparatus according to the present invention, the similar judgment is carried out in step S140 at which the alarm issuing means has started to issue an alarm and the alarm control means has invalidated the operation of the alarm issuing means. If the result of this judgment is "NO", this step is repeatedly executed. If the result of the judgment in step S500 is "YES", the procedure proceeds to step 520.

In step S520, the alarm stopping unit stops alarm issuing over a predetermined period after the operating condition detecting unit concludes that the generator is in the running state. At the same time, the alarm stopping unit starts to run its operation. Hence, an operation of the alarm issuing unit is invalidated until a predetermined time will be elapsed.

In step 540, the comparing unit compares the output voltages of the generator and the battery to a predetermined value. The alarm issuing unit is configured to issues an alarm when the comparing unit concludes that one of the output voltages of the generator and the battery becomes small compared to the predetermined value. However, if one of the output voltages of the generator and the battery becomes small compared to the predetermined value in this stage, any alarm is not issued because the alarm stopping unit is in active.

In step S560, it is judged whether or not a predetermined time is elapsed since the operating condition detecting unit concludes that the generator starts to generate electric power. If the result of this judgment is "NO", the procedure proceeds to step S540. If the result of the judgment in step S560 is "YES", the procedure proceeds to step S580.

In step S580, the alarm stopping unit steps to invalidate the operation of the alarm issuing unit.

Therefore, in the known generator control apparatus, if the phase voltage of the armature winding drops instantaneously due to the large fluctuation of the rotation speed of the engine which may occur just after the engine is activated, the generator control apparatus issues an alarm to inform a driver of the automotive vehicle about generator trouble.

In contrast to the known generator control apparatus, the alarm control means of the apparatus according to the present invention is configured to invalidate the operation of the alarm issuing means until a predetermined time is elapsed from a start time of generating electric power by the generator even if the generating condition detecting means detects the abnormal operating condition of the generator. If the generating condition detecting means detects the abnormal operating condition of the generator, any alarm informing the driver about the abnormal operating condition of a generator due to the large fluctuation of the rotation speed of the engine is not issued. Therefore, the driver of the vehicle concentrates his or her attention to an abnormal operating condition of the generator due to other reason than the large fluctuation of the rotation speed of the engine just after the engine of the vehicle is activated, such as small output voltage of the generator or the battery and over-voltage of the generator or the battery, and the like.

Further, the predetermined time over which the alarm control means invalidates the operation of the alarm issuing unit is preferably set such that if environmental temperature becomes higher, the predetermined time becomes shorter, and vice versa, that is, if the environmental temperature becomes lower, the predetermined time becomes longer. This is reflected a fact that a necessary time which is needed until the rotation speed of the engine is stabilized from a start time of activating the engine becomes longer as the environmental temperature becomes to lower, and the necessary time becomes shorter as the environmental temperature becomes higher. As a result of having a temperature dependence of the predetermined time over which the alarm control means invalidates the operation of the alarm issuing unit, the alarm control means certainly invalidates the operation of the alarm issuing means so as to prevent from issuing alarm informing the driver about the abnormal operating condition of a generator due to the large fluctuation of the rotation speed of the engine. Further the alarm control means set a suitable predetermined time over which the alarm control means invalidates the operation of the alarm issuing unit by considering the environmental temperature.

Further, it is possible that operations of the generating condition detecting means, the alarm issuing means, and the alarm control means are functionally established by software carried out by a microcomputer.

In this case, the operations of the generating condition detecting means, the alarm issuing means, and the alarm control means are defined by computer programs.

Second Embodiment

In the first embodiment described above, following the generating condition detector 53 detects the evidence that the generator 1 starts to generate electric power, the masking unit 55 prevents from issuing the generator stopping alarm signal. However, it is possible that the masking unit 55 prevents from issuing the generator stopping alarm signal until an operating condition of the engine of the vehicle becomes to be in a steady state thereof. In other words, the masking unit 55 prevents from issuing the generator stopping alarm signal from a time when the generator 1 of the vehicle starts to generate electric power to a further time when the operating condition of the engine becomes to be in the steady state.

FIG. 2 is a block diagram showing a generator 1 for use in a vehicle. The generator 1 including a generator control apparatus according to the second embodiment of the present invention.

The generator control apparatus 5A shown in FIG. 2 differs from the generator control apparatus 5 shown in FIG. 1 in a constituent in which the generator control apparatus 5A includes an engine condition detecting unit 55A in addition to the constituents of the generator control apparatus 5 shown in FIG. 1, although the generator control apparatus 5A does not have the masking unit 55 and the temperature sensing unit 61.

The engine condition detecting unit 55A constitutes engine condition detecting means and an engine condition detector.

In this embodiment, the generating condition detector 53 serves as generating condition detecting means and generator condition detector. The OR unit 60 and the switching element 54 are constituted of alarm issuing means and an alarm issuing unit. The OR unit 60 are constituted of alarm control means and an alarm controller.

The engine condition detecting unit 55A determines whether or not an activation of the engine of the vehicle is completed based on phase voltage of the armature winding 6 which appears at the terminal P shown in FIG. 2 following the generating condition detector 53 detects the evidence that the generator 1 starts to generate electric power. In more detail, the engine condition detecting unit 55A receives divided voltage which is a portion of the phase voltage of the armature winding 6 which appears at the terminal P shown in FIG. 2 by a dividing unit constituted by the resisters 62, 63. If amplitude of this divided voltage exceeds a predetermined value, or if frequency of phase voltage of an armature winding 6 exceeds a predetermined value, the engine condition detecting unit 55A produces a high level output indicating that an operating condition of the engine becomes to be in a steady state, that is, the activation of the engine is completed. Otherwise the engine condition detecting unit 55A produces a low level output. The operation of the engine condition detecting unit 55A is similar to that of the generating condition detector 53. In general, the rotation speed of the engine just after the engine is activated is smaller than that after the operating condition of the engine is in the steady state. Thus, the reference value of the phase voltage or the frequency of the phase voltage used in the engine condition detecting unit 55A is set to be larger than those used in the generating condition detector 53.

The engine condition detecting unit 55A continues to produce a high level output during an interval between a time when the generating condition detector 53 changes in a level of the output from low to high and a further time when the engine condition detecting unit 55A detects the evidence that the activation of the engine is completed. Otherwise the engine condition detecting unit 55A produces a low level output. That is, in the interval between a time when the engine is activated and a further time when the operating condition of the engine is in the steady state, the OR unit 59 continues to produce the high level output and the inverter 58 produces the low level output. This means that the generator stopping alarm signal is masked. Hence, even if the generating condition detector 53 detects an abnormal operating condition of the generator 1, the charging lamp never light up. Therefore, it is possible to prevent from informing the driver of the abnormal operating condition of a generator 1 due to the large fluctuation of a rotation speed of the engine during activating the engine of the vehicle by lighting up the charging lamp 10 intermittently. Further the masking unit 55 can set the shortest masking time. Because the engine condition detecting unit 55A determines whether or not an activation of the engine of the vehicle is completed based on phase voltage of the armature winding 6, it is possible to determine whether or not the operating condition of the engine of the vehicle becomes to be the steady state without any extra communication between the engine and an external device about the operating condition of the engine.

Further, the generator 1 preferably further comprises a sensor or an extra device that obtains information about the operating condition of the engine, such as the rotation speed of the engine. It is possible that the engine condition detecting unit 55A determines whether or not an activation of the engine of the vehicle is completed based on information obtained by the sensor or the extra device.

Further, in the embodiment described above, the charging lamp 10 is provided in order to inform the driver of the abnormal operating condition of the generator 1. It can be possible that the generator control apparatus 5 is connected to an external control unit that lights up a warning lamp, or gives a warning signal via the terminal L in FIGS. 1 and 2.

The operation of the apparatus shown in FIG. 4 will now be explained with referring to FIG. 5.

Figure 5:
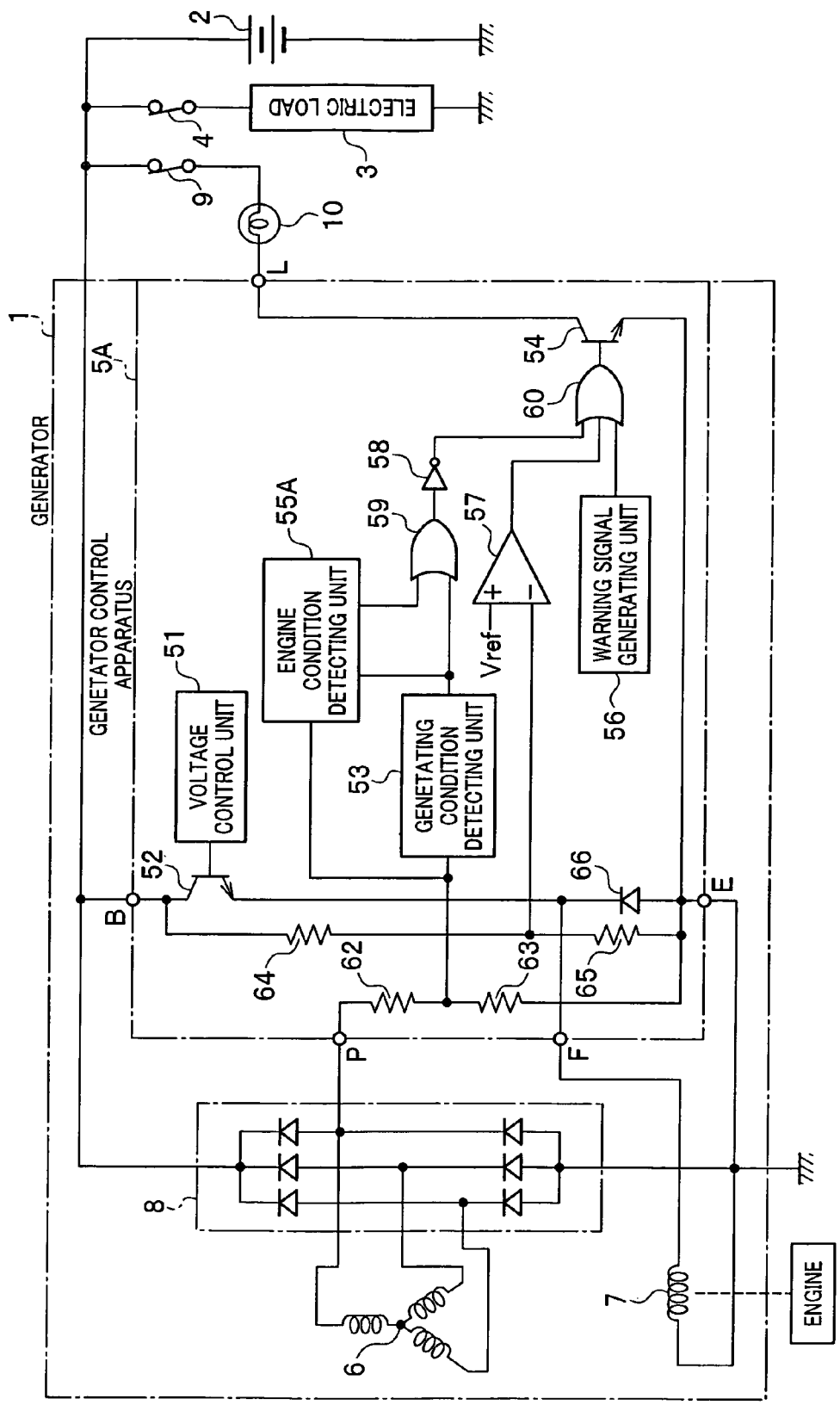
FIG. 5 is a block diagram showing an on-vehicle generator including a generator control apparatus according to a second embodiment of the present invention.
Figure 6:
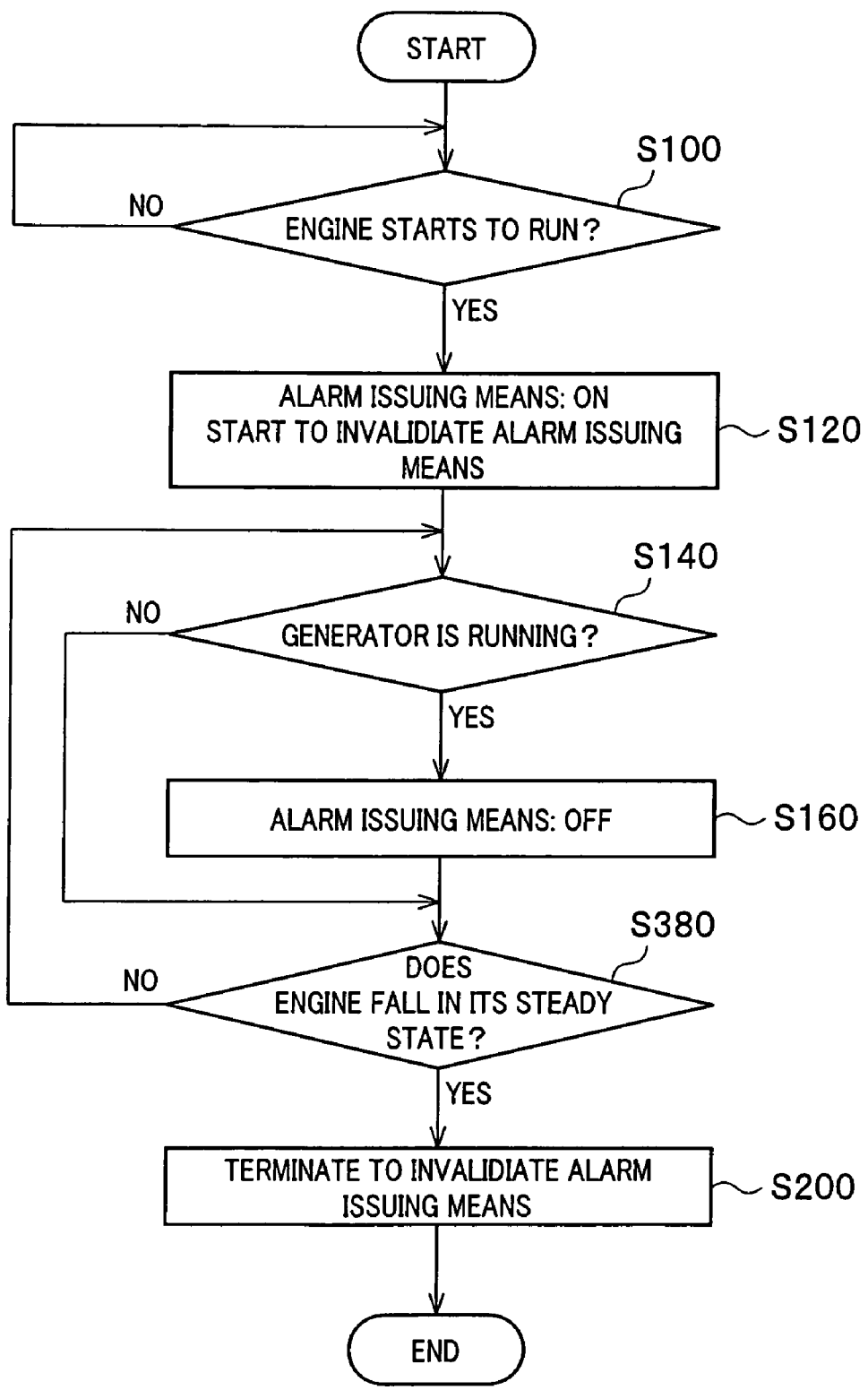
FIG. 6 is a flow chart showing operation steps of the generator control apparatus shown in FIG. 4.

FIG. 5 is a flow chart showing operation steps of the apparatus shown in FIG. 4. The apparatus shown in FIG. 5 has the engine condition detecting unit 55A that determines whether or not an activation of the engine of the vehicle is completed.

The step which has the same operation with that in FIG. 3 is indexed by the same reference number with that in FIG. 3.

It can be seen that step S180 in FIG. 3 is replaced by step S380 in FIG. 5.

In step S380, it is judged whether or not an activation of the engine of the vehicle is completed. This step is executed by the engine condition detecting means. If the result of this judgment is "NO", the procedure proceeds to step S140 in which it is judged whether or not the generator falls in its running state. If the result of the judgment in this step is "YES", the procedure proceeds to step S200 in which the alarm control means steps to invalidate the operation of the alarm issuing means.

According to the second embodiment of the embodiment of the present invention, the generator control apparatus includes the engine condition detecting means that at least determines whether or not an operating condition of the engine of the vehicle becomes to be a running state. Hence, the predetermined time over which the alarm control means invalidates the operation of the alarm issuing unit runs from a time when the generating condition detecting means detects that the generator of the vehicle starts to generate electric power to a further time when the engine condition detecting means detects that the operating condition of the engine becomes to be in a running state. As a result of this, the alarm control means certainly invalidates the operation of the alarm issuing unit so as to prevent from issuing alarm informing the driver about the abnormal operating condition of a generator due to the large fluctuation of the rotation speed of the engine. Further, the predetermined time over which the alarm controller invalidates the operation of the alarm issuing means can be minimized.

Further, the engine condition detecting means determines that the operating condition of the engine of the vehicle becomes to be the steady state if frequency of phase voltage of an armature winding of the generator exceeds a predetermined value, or if the phase voltage of the armature windings of the generator exceeds a predetermined value. Hence it is possible to determine whether or not the operating condition of the engine of the vehicle becomes to be the steady state without any extra communication between the engine and an external device about the operating condition of the engine.

Further, it is possible that operations of the generating condition detecting means, the alarm issuing means, the alarm control means, and the engine condition detecting means are functionally established by software carried out by a microcomputer.

In this case, the operations of the generating condition detecting means, the alarm issuing means, the alarm control means, and the engine condition detecting means are defined by computer programs.

(Modification)

In the foregoing description of the present invention, the invention has been disclosed with reference to specific embodiments thereof. However, it will be evident that various modifications and changes may be made to the specific embodiments of the present invention without departing from the scope of the invention as set forth in the appended claims. Accordingly, the description of the present invention is to be regarded in an illustrative, rather than a restrictive, sense.

For example, operation of the generator control apparatus described in the first and the second embodiments can be carried out by a microcomputer.

In the apparatus according to the first embodiment of the present invention, the reference table 55b contains information about the relationship between the masking time and the environmental temperature. Preferably, the apparatus further include a sensor that monitors one or more of engine conditions. The engine conditions include crank speed, cam phase, coolant temperature, boost pressure, air mass and the like. Then, it is possible the reference table 55b contains information about the relationship among the masking time, the environmental temperature, and at least one of the engine conditions.

What is claimed is:

1. An apparatus for use in an automotive vehicle having an engine and a generator, comprising:
    a generating condition detector that determines whether or not an operating condition of the generator is in an abnormal operating condition;
    an alarm issuing unit that issues an alarm to a driver of the automotive vehicle about an abnormal operating condition of the generator when the generating condition detector detects evidence that the generator is running under the abnormal operating condition;
    an alarm controller that invalidates an operation of the alarm issuing unit until a predetermined time elapses after the generator starts to generate electric power even if the alarm issuing unit stops issuing the alarm to the driver of the automotive vehicle based on a result of whether or not the operating condition of the generator is in the abnormal operating condition determined by the generating condition detector; and
    a temperature sensor that detects environmental temperature of the apparatus, wherein
    the alarm controller sets the predetermined time over which the operation of the alarm issuing unit is invalidated such that if the environmental temperature detected by the temperature sensor becomes higher, the predetermined time becomes shorter.

2. An apparatus for use in an automotive vehicle having an engine and a generator, comprising:
    a generating condition detector that determines whether or not an operating condition of the generator is in an abnormal operating condition;
    an alarm issuing unit that issues an alarm to a driver of the automotive vehicle about an abnormal operating condition of the generator when the generating condition detector detects evidence that the generator is running under the abnormal operating condition;
    an alarm controller that invalidates an operation of the alarm issuing unit until a predetermined time elapses after the generator starts to generate electric power; and
    an engine condition detecting unit that determines whether or not an operating condition of the engine of the automotive vehicle is in a steady state, wherein
    the alarm controller invalidates the operation of the alarm issuing unit in an interval between a time when the generating condition detector detects the evidence that the generator starts to generate electric power and a further time when the engine condition detecting unit determines that the operating condition of the engine of the vehicle is in the steady state.

3. The apparatus according to claim 2, wherein
    the generator has an armature winding that generates electric power if the armature winding is driven, and
    the engine condition detecting unit determines that the operating condition of the engine is in the steady state if frequency of phase voltage of the armature winding exceeds a predetermined value.

4. The apparatus according to claim 2, wherein
    the generator has an armature winding that generates electric power if the armature winding is driven, and
    the engine condition detecting unit determines that the operating condition of the engine is in the steady state if the phase voltage of the armature winding exceeds a predetermined value.

5. A method for use in an automotive vehicle having an engine and a generator, comprising steps of:
    detecting an operating condition of the generator;
    issuing an alarm to a driver of the automotive vehicle about occurrence of an abnormal operating condition of the generator based on a result of detecting the operating condition of the generator;
    invalidating alarm issuing until a predetermined time elapses from a time when the generator starts to generate electric power; and
    determining whether or not an operating condition of the engine of the automotive vehicle is in a running state of the engine,
    wherein alarm issuing is invalidated in an interval between the time when the generator starts to generate electric power and a further time when the operating condition of the engine of the automotive vehicle is in the running state of the engine.

6. The method according to claim 5, wherein
    the alarm issuing is invalidated until the predetermined time elapses after the generator starts to generate electric power, even if the abnormal operating condition of the generator is detected.

7. The method according to claim 6, wherein
    the generator has an armature winding that generates electric power if the
    detecting the operating condition of the generator is based on detecting the phase voltage of the armature winding.

* * * * *